(12) United States Patent
Soga et al.

(10) Patent No.: US 10,907,037 B2
(45) Date of Patent: Feb. 2, 2021

(54) CURABLE RESIN COMPOSITION, FUEL CELL, AND SEALING METHOD

(71) Applicant: THREEBOND CO., LTD., Hachioji (JP)

(72) Inventors: Tetsunori Soga, Hachioji (JP); Hiroshi Takebe, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 182 days.

(21) Appl. No.: 16/307,814

(22) PCT Filed: Jun. 28, 2017

(86) PCT No.: PCT/JP2017/023750
§ 371 (c)(1),
(2) Date: Dec. 6, 2018

(87) PCT Pub. No.: WO2018/003855
PCT Pub. Date: Jan. 4, 2018

(65) Prior Publication Data
US 2019/0300690 A1   Oct. 3, 2019

(30) Foreign Application Priority Data

Jun. 28, 2016 (JP) .................... 2016-127337

(51) Int. Cl.
*C08L 23/22* (2006.01)
*H01M 8/0284* (2016.01)
(Continued)

(52) U.S. Cl.
CPC ............ *C08L 23/22* (2013.01); *C08K 5/5419* (2013.01); *C08K 5/5425* (2013.01); *C08L 83/04* (2013.01);
(Continued)

(58) Field of Classification Search
CPC ....... C08L 23/22; C08L 83/04; C08K 5/5419; C08K 5/5425
See application file for complete search history.

(56) References Cited

U.S. PATENT DOCUMENTS

| 6,555,620 B1 | 4/2003 | Manabe et al. |
| 7,202,309 B2 * | 4/2007 | Furrer ...................... C08F 8/42 |
| | | 525/342 |

(Continued)

FOREIGN PATENT DOCUMENTS

| CN | 101036256 A | 9/2007 |
| CN | 101395749 A | 3/2009 |

(Continued)

OTHER PUBLICATIONS

Machine translation of JP 2001325972 (no date).*

(Continued)

*Primary Examiner* — Amanda C. Walke
(74) *Attorney, Agent, or Firm* — Manabu Kanesaka

(57) ABSTRACT

The present invention aims to provide a curable resin composition which has low viscosity as well as properties such as high elongation property, hydrogen gas barrier property, and adhesiveness. A curable resin composition includes ingredients (A) to (D): ingredient (A): a vinyl polymer having one or more alkenyl groups in one molecule, ingredient (B): a compound having one or more hydrosilyl groups in one molecule,
ingredient (C): a hydrosilylation catalyst, and ingredient (D): a polydimethylsiloxane oligomer having one or more ethylenically unsaturated groups and one or more hydrolyzable silyl groups in one molecule.

13 Claims, 1 Drawing Sheet

(51) Int. Cl.
    *C08K 5/5419*  (2006.01)
    *C08K 5/5425*  (2006.01)
    *H01M 8/10*    (2016.01)
    *H01M 8/02*    (2016.01)
    *C08L 83/04*   (2006.01)
    *C09K 3/10*    (2006.01)
    *C08L 101/02*  (2006.01)
    *F16J 15/14*   (2006.01)

(52) U.S. Cl.
    CPC .............. *C08L 101/02* (2013.01); *C09K 3/10* (2013.01); *H01M 8/02* (2013.01); *H01M 8/0284* (2013.01); *H01M 8/10* (2013.01); *C08L 2203/20* (2013.01); *F16J 15/14* (2013.01)

(56) References Cited

U.S. PATENT DOCUMENTS

| | | | | |
|---|---|---|---|---|
| 7,521,509 | B2* | 4/2009 | Morikawa | C08F 8/42 525/102 |
| 8,158,205 | B2* | 4/2012 | Oboodi | C23C 18/1283 427/376.1 |
| 8,945,701 | B2* | 2/2015 | Ikenaga | C08L 51/06 428/159 |
| 9,587,084 | B2* | 3/2017 | Biscoglio | C08K 3/2279 |
| 2002/0187385 | A1* | 12/2002 | Meguriya | C08L 83/04 525/100 |
| 2005/0043480 | A1 | 2/2005 | Osawa | |
| 2006/0052546 | A1 | 3/2006 | Morikawa et al. | |
| 2006/0078781 | A1 | 4/2006 | Stegink et al. | |
| 2008/0139734 | A1 | 6/2008 | Nakashima et al. | |
| 2009/0000732 | A1 | 1/2009 | Jacobine et al. | |
| 2009/0004541 | A1 | 1/2009 | Jacobine et al. | |
| 2009/0176953 | A1 | 7/2009 | Morikawa et al. | |
| 2012/0214925 | A1* | 8/2012 | Gubbels | C08L 83/04 524/413 |
| 2013/0082369 | A1 | 4/2013 | Kokubo et al. | |
| 2013/0330562 | A1 | 12/2013 | Irifune et al. | |
| 2015/0188008 | A1 | 7/2015 | Kokubo et al. | |
| 2017/0130031 | A1* | 5/2017 | Yamaguchi | C08L 83/04 |
| 2020/0048508 | A1* | 2/2020 | Onozawa | C08G 77/46 |
| 2020/0199363 | A1* | 6/2020 | Fang | C08L 83/04 |

FOREIGN PATENT DOCUMENTS

| | | | |
|---|---|---|---|
| CN | 102575105 | A | 7/2012 |
| CN | 102844383 | A | 12/2012 |
| CN | 103484017 | A | 1/2014 |
| CN | 104736581 | A | 6/2015 |
| EP | 1197522 | A1 | 4/2002 |
| EP | 1743928 | A1 | 1/2007 |
| JP | H06-158024 | A | 6/1994 |
| JP | 2001-325972 | A | 11/2001 |
| JP | 2001325972 | A * | 11/2001 |
| JP | 2004-075824 | A | 3/2004 |
| JP | 2004-111146 | A | 4/2004 |
| JP | 2007-100099 | A | 4/2007 |
| JP | 2008-516395 | A | 5/2008 |
| JP | 2009102482 | A * | 5/2009 |
| JP | 2009-524194 | A | 6/2009 |
| JP | 2011-124258 | A | 6/2011 |
| JP | 2013-508493 | A | 3/2013 |
| WO | 01/00727 | A1 | 1/2001 |
| WO | 2005/093005 | A1 | 10/2005 |
| WO | 2017/018546 | A1 | 2/2017 |
| WO | 2017/018547 | A1 | 2/2017 |
| WO | 2017/029978 | A1 | 2/2017 |
| WO | 2017/038340 | A1 | 3/2017 |
| WO | WO-2018003855 | A1 * | 1/2018 ............... C09K 3/10 |

OTHER PUBLICATIONS

PCT/ISA/210, "International Search Report for International Application No. PCT/JP2017/023750," dated Sep. 19, 2017.

China Patent Office, "Office Action for Chinese Patent Application No. 201780035908.8," dated Sep. 29, 2020.

* cited by examiner

CURABLE RESIN COMPOSITION, FUEL CELL, AND SEALING METHOD

RELATED APPLICATIONS

The present application is National Phase of International Application No. PCT/JP2017/023750 filed Jun. 28, 2017, and claims priority from Japanese Application No. 2016-127337, filed Jun. 28, 2016, the disclosure of which is hereby incorporated by reference herein in its entirety.

TECHNICAL FIELD

The present invention relates to a curable resin composition having low viscosity as well as properties such as high elongation property, hydrogen gas barrier property, and adhesiveness.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and generates only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operating temperature is relatively low temperature (around 80° C.), and therefore is expected for usages such as power sources for automobiles, power generators for households, small power sources for electronic equipment such as mobile phones, and power sources for emergency.

As illustrated in FIG. 1, a cell 1 of a solid polymer fuel cell has a structure including: an electrolyte membrane electrode assembly 5 (MEA) structured such that a polymer electrolyte membrane 4 is nipped between an air electrode 3a and a fuel electrode 3b; a frame 6 which supports the MEA; and separators 2 by which gas flow paths are formed.

In order to activate the solid polymer fuel cell, it is necessary to supply a fuel gas containing hydrogen to an anode electrode and supply an oxidation gas containing oxygen to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene-based polymer and causes a hydrosilylation reaction (see Patent Literature 1); a thermosetting resin composition which uses a fluoropolyether compound and causes a hydrosilylation reaction (see Patent Literature 2); a thermosetting resin composition which uses a fluoropolymer and causes a hydrosilylation reaction (see Patent Literature 3); and a thermosetting resin composition which uses an ethylene-propylene-diene rubber (see Patent Literature 4) as these compositions are rubber elastic bodies being excellent in hydrogen gas barrier properties, low moisture permeability, heat resistance, acid resistance, and flexibility.

CITATION LIST

Patent Literatures

Patent Literature 1: Japanese Patent Application Publication No. 2004-111146
Patent Literature 2: Japanese Patent Application Publication No. 2004-075824
Patent Literature 3: Japanese Patent Application Publication No. 2007-100099
Patent Literature 4: Japanese Patent Application Publication No. 2011-124258

SUMMARY OF INVENTION

The thermosetting resin compositions of Patent Literatures 1 to 4, however, use the polymers each having a large molecular weight in order to improve the sealing property, and therefore have a problem that the viscosity increases and the coating workability deteriorates. Also, it is common to use a method for adding a plasticizer to a curable resin composition to lower the viscosity thereof, but this method also causes a problem of lowering of the high elongation property, the hydrogen gas barrier property, and the adhesiveness.

Under these circumstances, an object of the present invention is to provide a curable resin composition which has low viscosity as well as properties such as high elongation property, hydrogen gas barrier property, and adhesiveness.

Means for Solution of the Problems

The above problems can be solved by the curable resin composition of the present invention.

The present invention is a curable resin composition comprising the following ingredients (A) to (D):
ingredient (A): a vinyl polymer having one or more alkenyl groups in one molecule
ingredient (B): a compound having one or more hydrosilyl groups in one molecule
ingredient (C): a hydrosilylation catalyst
ingredient (D): a polydiorganosiloxane oligomer having one or more ethylenically unsaturated groups and one or more hydrolyzable silyl groups in one molecule In other embodiments, the present invention is a fuel cell which uses the curable resin composition including the following ingredients (A) to (D) in any of a seal between adjacent separators in the fuel cell and a seal between a frame and an electrolyte membrane or MEA in the fuel cell.
ingredient (A): a vinyl polymer having one or more alkenyl groups in one molecule
ingredient (B): a compound having one or more hydrosilyl groups in one molecule
ingredient (C): a hydrosilylation catalyst
ingredient (D): a polydimethylsiloxane oligomer having one or more ethylenically unsaturated groups and one or more hydrolyzable silyl groups in one molecule In other embodiments, the present invention is a sealing method involving: applying the curable resin composition to a flange of a seal target component; and curing the curable resin composition for sealing, with the flange stuck on another flange, by heating or irradiation with active energy rays.

In other embodiments, the present invention is a sealing method involving: applying the curable resin composition to a flange of a seal target component; forming a gasket by curing the curable resin composition by heating or irradiation with active energy rays; and performing compression sealing with the flange stuck on another flange.

In other embodiments, the present invention is a sealing method involving: placing a mold in pressure contact with a flange of a seal target component in advance; forming a gasket by injecting the curable resin composition into a cavity formed between the mold and the flange, and curing the curable resin composition by heating or irradiation with active energy rays; and performing sealing with the flange stuck on the other flange.

Advantageous Effects of Invention

The present invention aims to provide a curable resin composition which has low viscosity as well as properties such as high elongation property, hydrogen gas barrier property, and adhesiveness.

Furthermore, the present invention can be in the following mode.

[1]
A curable resin composition comprising ingredients (A) to (D):
ingredient (A): a vinyl polymer having one or more alkenyl groups in one molecule
ingredient (B): a compound having one or more hydrosilyl groups in one molecule
ingredient (C): a hydrosilylation catalyst
ingredient (D): a polydiorganosiloxane oligomer having one or more ethylenically unsaturated groups and one or more hydrolyzable silyl groups in one molecule.

[2]
The curable resin composition according to [1] described above, further comprising a silane compound represented by general formula (1) as ingredient (E)

$$Si(OR)_{4-(m+n)}(X)_m(R)_n \quad (1),$$

where R in the formula represents an alkyl group having 1 to 20 carbon atoms, X is any of a vinyl group, an allyl group, a (meth)acryloyl group, and a styryl group, m is 1 to 3, n is 0 to 2, and m+n≤3.

[3]
The curable resin composition according to [1] or [2] described above, wherein the ingredient (A) is a polyisobutylene having one or more alkenyl groups.

[4]
The curable resin composition according to any one of [1] to [3] described above, wherein the curable resin composition is used as a sealing agent for a fuel cell.

[5]
A curable sealing agent for a fuel cell comprising the curable resin composition according to any one of [1] to [4] described above.

[6]
The curable sealing agent for a fuel cell according to [5] described above, wherein the curable sealing agent for a fuel cell is a sealing agent for a periphery of any member selected from the group consisting of separators, frames, electrolyte membranes, fuel electrodes, air electrodes, and electrolyte membrane electrode assemblies, which are members in a fuel cell.

[7]
The curable sealing agent for a fuel cell according to [5] or [6] described above, wherein the curable sealing agent for a fuel cell is a sealing agent between adjacent separators in a fuel cell or a sealing agent between a frame of a fuel cell and an electrolyte membrane or an electrolyte membrane electrode assembly.

[8]
The curable sealing agent for a fuel cell according to any one of [5] to [7] described above, wherein the fuel cell is a solid polymer fuel cell.

[9]
A cured product obtained by curing the curable resin composition according to any one of [1] to [4] described above.

[10]
A fuel cell comprising any seal selected from the group consisting of seals between adjacent separators in the fuel cell and seals between a frame and an electrolyte membrane or an electrolyte membrane electrode assembly in the fuel cell, wherein
any one of the seals contains the cured product according to [9] described above.

[11]
The fuel cell according to [10] described above, wherein the fuel cell is a solid polymer fuel cell.

[12]
A method for sealing at least part of at least two flanges of seal target components including the at least two flanges, at least one of which is light-transmissive, allowing active energy rays to pass therethrough, the method comprising the steps of:
applying the curable resin composition according to any one of [1] to [4] described above to a surface of at least one of the flanges;
sticking the one flange with the curable resin composition applied thereto onto the other flange with the curable resin composition interposed in between; and
sealing the at least part of between the at least two flanges by curing the curable resin composition by irradiation with active energy rays through the light-transmissive flange.

[13]
A method for sealing at least part of at least two flanges of seal target components including the at least two flanges, comprising the steps of:
applying the curable resin composition according to any one of [1] to [4] described above to at least one of the flanges;
irradiating the applied curable resin composition with active energy rays to cure the curable resin composition, thereby forming a gasket composed of a cured product of the curable resin composition;
placing the other flange on the gasket, and sealing the at least part of between the at least two flanges in such a way that the other flange and the one flange with the curable resin composition applied thereto are pressure bonded together with the gasket interposed in between.

[14]
A method for sealing at least part of at least two flanges of seal target components including the at least two flanges, comprising the steps of:
placing a gasket formation mold on at least one of the flanges;
injecting the curable resin composition according to any one of [1] to [4] described above into at least part of a cavity formed between the gasket formation mold and the flange on which the mold is placed;

irradiating the curable resin composition with the active energy rays to cure the curable resin composition, thereby forming a gasket composed of a cured product of the curable resin composition;

detaching the mold from the one flange; and sealing the at least part of between the at least two flanges by placing the other flange on the gasket and then pressure bonding the one and the other flanges together with the gasket interposed in between.

Another mode of the present invention may be as follows.

[1b]

A curable resin composition comprising ingredients (A) to (D):

ingredient (A): a vinyl polymer having one or more alkenyl groups in one molecule ingredient (B): a compound having one or more hydrosilyl groups in one molecule ingredient (C): a hydrosilylation catalyst ingredient (D): a polydiorganosiloxane oligomer having one or more ethylenically unsaturated groups and one or more hydrolyzable silyl groups in one molecule

[2b]

The curable resin composition according to [1b] described above, further comprising a silane compound represented by general formula (1) as ingredient (E)

$$Si(OR)_{4-(m+n)}(X)_m(R)_n \quad (1),$$

where R in the formula represents an alkyl group having 1 to 20 carbon atoms, X is any of a vinyl group, an allyl group, a (meth)acryloyl group, and a styryl group, m is 1 to 3, n is 0 to 2, and m+n≤3.

[3b]

The curable resin composition according to [1b] or [2b] described above, wherein the ingredient (A) is a polyisobutylene having one or more alkenyl groups.

[4b]

The curable resin composition according to any one of [1b] to [3b] described above, wherein the curable resin composition is used as a sealing agent for a fuel cell.

[5b]

The curable resin composition according to any one of [1b] to [4b] described above, wherein the curable resin composition is used for sealing anything selected from the group consisting of separators, frames, electrolyte membranes, fuel electrodes, air electrodes, and MEA, which are members in a fuel cell.

[6b]

The curable resin composition according to any one of [1b] to [5b] described above, wherein the curable resin composition is used for a sealing agent between adjacent separators in a fuel cell or a seal between a frame of a fuel cell and an electrolyte membrane or an MEA.

[7b]

The curable resin composition according to any one of [4b] to [6b] described above, wherein the fuel cell is a solid polymer fuel cell.

[8b]

A fuel cell wherein the curable resin composition according to any one of [1b] to [3b] described above is used for any of a seal between adjacent separators in the fuel cell and a seal between a frame and an electrolyte membrane or an MEA in the fuel cell

[9b]

The fuel cell according to [8b] described above, wherein the fuel cell is a solid polymer fuel cell.

[10b]

A sealing method comprising:

applying the curable resin composition according to any one of [1b] to [3b] described above to a flange of a seal target component; and curing the curable resin composition for sealing, with the flange stuck on another flange, by heating or irradiation with active energy rays.

[11b]

A sealing method comprising:

applying the curable resin composition according to any one of [1b] to [3b] described above to a flange of a seal target component;

forming a gasket by curing the curable resin composition by heating or irradiation with active energy rays; and performing compression sealing with the flange stuck on another flange.

[12b]

A sealing method comprising:

placing a mold in pressure contact with a flange of a seal target component in advance;

forming a gasket by injecting the curable resin composition according to any one of [1b] to [3b] described above into a cavity formed between the mold and the flange, and curing the curable resin composition by heating or irradiation with active energy rays; and performing sealing with the flange stuck on the other flange.

DESCRIPTION OF EMBODIMENTS

Figure 1:
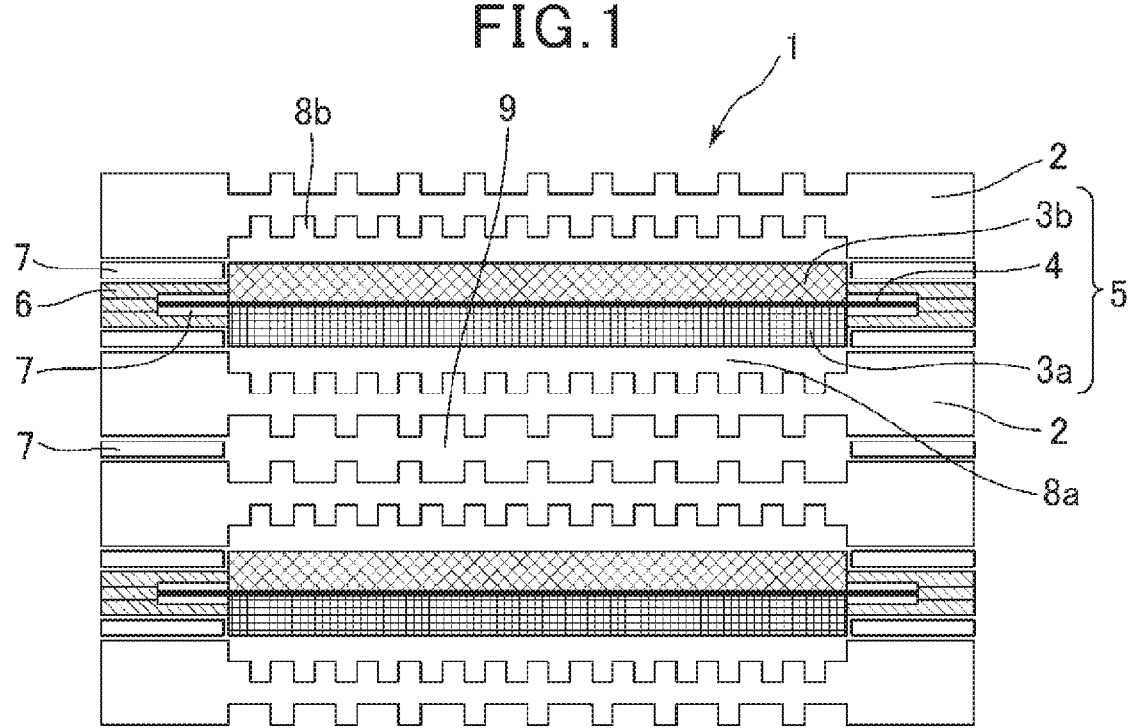
FIG. 1 is a schematic cross sectional view of a single cell of a fuel cell.

The details of the invention are described below.

<Curable Resin Composition>

The present invention is a curable resin composition comprising the following ingredients (A) to (D):

ingredient (A): a vinyl polymer having one or more alkenyl groups in one molecule ingredient (B): a compound having one or more hydrosilyl groups in one molecule ingredient (C): a hydrosilylation catalyst ingredient (D): a polydiorganosiloxane oligomer having one or more ethylenically unsaturated groups and one or more hydrolyzable silyl groups in one molecule It is possible to use the ingredients (A) to (D) as well as ingredient (E) and optional ingredients to be described later in the curable resin composition of the present invention by appropriately combining ingredients satisfying any of the conditions described below.

<Ingredient (A)>

The ingredient (A) used in the present invention is not particularly limited as long as it is a vinyl polymer having one or more alkenyl groups in one molecule. The viscosity of the ingredient (A) of the present invention at 25° C. is, though not particularly limited, preferably 5 to 3000 Pa·s, more preferably 50 to 2500 Pa·s, and particularly preferably 100 to 2000 Pa·s from the viewpoint of workability and the like. Note that the measurement of the viscosity was carried out using a cone plate type viscometer. In addition, the case where an alkenyl group is at the end of the main chain of the vinyl polymer is preferable from the viewpoint that it is possible to obtain a rubber elastic body with low hardness as well as high strength and low compression set.

The molecular weight of the ingredient (A) of the present invention is, though not particularly limited, preferably 500 to 500,000, further preferably 1,000 to 100,000, and particularly preferably 3,000 to 50,000 in terms of number average molecular weight from the viewpoint of e.g. fluidity and physical properties after curing. Note that number average molecular weight was calculated by a standard polystyrene conversion method using size exclusion chromatography (SEC).

Additionally, the vinyl polymer of the ingredient (A) includes, for example, polymers which are produced by mainly polymerizing a monomer selected from the group consisting of polyisobutylene, polyisoprene, polybutadiene, styrene, (meth)acrylic acid, (meth)acrylic esters, (meth) acrylamide, acrylonitrile, vinyl acetate fluorine-containing vinyl-based monomers, and silicon-containing vinyl-based monomers. Among them, polyisobutylene, polyisoprene, and polybutadiene are preferable from the viewpoint of sealing property and polyisobutylene is particularly preferable from the viewpoint of excellence in hydrogen gas barrier property.

The polyisobutylene of the ingredient (A) may have, for example, a —[$CH_2C(CH_3)_2$]— unit or may be polyisobutylene containing a "constituent unit other than the —[$CH_2C(CH_3)_2$]— unit." In addition, the polyisobutylene contains preferably 50% by mass or more and more preferably 70% by mass or more of the —[$CH_2C(CH_3)_2$]— unit. Note that in the present invention, the term "polymer" refers to a compound which has a structure with repeating units of monomers in the main chain of the polymer and which is composed of 100 or more repeating units.

For example, commercially available products of the polyisobutylene of the ingredient (A) include, but are not limited to, EPION 200A, 400A, and 600A (manufactured by Kaneka Corporation), and the like.

<Ingredient (B)>

Hydrosilyl group-containing compounds of the ingredient (B) of the present invention are not particularly limited as long as they are cured by hydrosilylation reaction with the ingredient (A). The hydrosilyl group represents a group having a SiH bond. The ingredient (B) includes, but is not particularly limited to, polysiloxanes and the like, preferably organohydrogen polysiloxanes, and more specifically silicones containing a hydrosilyl group in a molecule which is a linear, branched, cyclic, or reticular molecule. Additionally, a compound having two or more hydrosilyl groups is preferable.

Commercially available products of the ingredient (B) include, but are not particularly limited to, CR-300 and CR-500 (manufactured by Kaneka Corporation), HMS-013, HMS-151, and HMS-301 (manufactured by Azmax Corporation), and SH 1107 Fluid (manufactured by Dow Corning Toray Co., Ltd.).

The amount of the ingredient (B) blended is, though not particularly limited, preferably 0.1 to 50 parts by mass, more preferably 1 to 40 parts by mass, further preferably 5 to 30 parts by mass, and particularly preferably 10 to 20 parts by mass relative to 100 parts by mass of the ingredient (A). Within the range of 0.1 parts by mass to 50 parts by mass, it is possible to obtain a good hydrogen gas barrier property of the curable resin composition.

As regards the amount of the ingredient (B) added, define an equivalent ratio (hydrosilyl groups/carbon-carbon double bonds), which is the ratio of the hydrosilyl groups of the ingredient (B) to the total number of carbon-carbon double bonds in the groups of the ingredients (A), (D), and (E), i.e. the alkenyl groups contained in the ingredient (A), the ethylenically unsaturated groups contained in the ingredient (D), and the vinyl groups, the allyl groups, the (meth) acryloyl. groups, and the styryl groups contained in the ingredient (E). The equivalent ratio is preferably 0.5 to 2.0 and particularly preferably 0.8 to 1.5. When the amount is more than 0.5 equivalents, the cross-linking density becomes high, and the hydrogen gas barrier property of the cured product tends to improve. When the amount is less than 2.0 equivalents, there is a tendency that a hydrogen gas is generated due to the dehydrogenation reaction and the cured product foaming problem does not occur.

<Ingredient (C)>

As regards the hydrosilylation catalyst which is the ingredient (C) of the present invention, any catalyst can be used without particular limitation.

In the case of curing the present curable resin composition by heating, preferable ingredients (C) include: solid platinum supported on a support such as chloroplatinic acid, platinum simple substance, alumina, silica, and carbon black; complexes of chloroplatinic acid with alcohol, aldehyde, and ketone; platinum-olefin complexes such as $Pt(CH_2=CH_2)_2Cl_2$; platinum-vinylsiloxane complexes such as a platinum divinyltetramethyldisiloxane complex, $Pt_n$ ($ViMe_2SiOSiMe_2Vi$)$_x$, and $Pt[(MeViSiO)_4]_y$; and platinum-phosphite complexes such as $Pt(PPh_3)_4$ and $Pt(PBu_3)_4$. Among these, chloroplatinic acid, the platinum-olefin complexes, and the platinum-vinylsiloxane complexes are preferable from the viewpoint of excellent activity. The Vi in the above description means a vinyl group.

In addition, when curing the present curable resin composition by irradiation with active energy rays such as ultraviolet rays, preferable ingredients (C) include, for example, a platinum complex having a β-diketonate compound as a ligand and a platinum complex having a cyclic diene compound as a ligand.

The platinum complexes having a β-diketonate compound as a ligand include, for example, trimethyl (acetylacetonato) platinum, trimethyl (3,5-heptanedionate) platinum, trimethyl (methyl acetoacetate) platinum, bis(2,4-pentanedionato) platinum, bis(2,4-hexanedionato) platinum, bis (2,4-heptanedionato) platinum, bis(3,5-heptanedionato) platinum, bis(l-phenyl-1,3-butanedionato) platinum, and bis (1,3-diphenyl-1,3-propanedionato) platinum. Among them, bis(2,4-pentanedionato) platinum is particularly preferable from the viewpoint of high activity by ultraviolet rays.

The platinum complexes having a cyclic diene compound as a ligand include, for example, a (1,5-cyclooctadienyl) dimethyl platinum complex, a (1,5-cyclooctadienyl) diphenyl platinum complex, a (1,5-cyclooctadienyl) dipropyl platinum complex, a (2,5-norboradiene) dimethyl platinum complex, a (2,5-norboradiene) diphenyl platinum complex, a (cyclopentadienyl) dimethyl platinum complex, a (methylcyclopentadienyl) diethyl platinum complex, a (trimethylsilylcyclopentadienyl) diphenyl platinum complex, a (methylcycloocta-1,5-dienyl) diethyl platinum complex, a (cyclopentadienyl) trimethyl platinum complex, a (cyclopentadienyl) ethyl dimethyl platinum complex, a (cyclopentadienyl) acetyl dimethyl platinum complex, a (methylcyclopentadienyl) trimethyl platinum complex, a (methylcyclopentadienyl) trihexyl platinum complex, a (trimethylsilylcyclopentadienyl) trimethyl platinum complex, a (dimethylphenylsilylcyclopentadienyl) triphenyl platinum complex, and a (cyclopentadienyl) dimethyl trimethylsilylmethyl platinum complex.

In addition, examples of catalysts other than platinum compounds include RhCl(PPh$_3$)$_3$, RhCl$_3$, RuCl$_3$, IrCl$_3$, FeCl$_3$, AlCl$_3$, PdCl$_2$·2H$_2$O, NiCl$_2$, and TiCl$_4$. These catalysts may be used singly or in combination of two or more kinds.

Although the amount of the ingredient (C) blended is not particularly limited, the ingredient (C) as a compound is better contained within a range of $1\times10^{-1}$ to $1\times10^{-8}$ mol and preferably contained within a range of $1\times10^{-2}$ to $1\times10^{-6}$ mol when 1 mol equals the total of the number of carbon-carbon double bonds in the alkenyl groups contained in the ingredient (A), the number of carbon-carbon double bonds in the ethylenically unsaturated groups contained in the ingredient (D), and the number of carbon-carbon double bonds in the vinyl groups, the allyl groups, the (meth)acryloyl groups, and the styryl groups contained in the ingredient (E). In addition, the absolute amount of the ingredient (C) in the curable resin composition is, for example, 10 to 1000 μl, preferably 50 to 500 μl, more preferably 70 to 300 μl, and further preferably 90 to 250 μl.

<Ingredient (D)>

The ingredient (D) of the present invention, the polydiorganosiloxane oligomer having one or more ethylenically unsaturated groups and one or more hydrolyzable silyl groups in one molecule, can be combined with other ingredients of the present invention to obtain significant effects that it can satisfy low viscosity as well as properties such as high elongation property, hydrogen gas barrier property, and adhesiveness. The polydiorganosiloxane oligomer of the present invention is a polymer which has two or more organosilicon compounds condensed to form a —Si—O—Si— structure and which has an average polymerization degree of 2 to 100. The ethylenically unsaturated group of the present invention is a group represented by a CH$_2$=CH—, and the ethylenically unsaturated group is contained in one molecule in an amount of 1 or more, preferably 2 or more, and more preferably 3 or more. The hydrolyzable silyl group of the present invention means a group in which at least one of the R groups in the group represented by R$_3$SiO— is each independently substituted with a hydrolyzable group. The R groups unsubstituted with a hydrolyzable group can include, for example, methyl groups, ethyl groups, propyl groups, phenyl groups, and benzyl groups.

The hydrolyzable groups include, for example, hydrogen atoms, alkoxy groups, acyloxy groups, ketoximate groups, acid amide groups, aminooxy groups, mercapto groups, and alkenyloxy groups. Among them, the alkoxy groups are preferable from the viewpoint of curability and raw material availability. Alkoxysilyl groups include trialkoxysilyl groups such as a trimethoxysilyl group, a triethoxysilyl group, and a triisopropoxysilyl group; dimethoxysilyl groups such as a dimethoxymethylsilyl group and a diethoxymethylsilyl group; and monoalkoxysilyl groups such as a methoxydimethoxysilyl group and an ethoxydimethylsilyl group. Among them, the dimethoxysilyl groups and the trimethoxysilyl groups are particularly preferable. Moreover, the ethylenically unsaturated group includes, for example, a vinyl group, an allyl group, a (meth)acryloyl group, and a styryl group.

The number average molecular weight of the ingredient (D) of the present invention is, though not particularly limited, preferably 200 to 10000, further preferably 250 to 5000, and particularly preferably 300 to 3000 in terms of number average molecular weight from the viewpoint that it is possible to satisfy properties such as high elongation property, hydrogen gas barrier property, and adhesiveness.

Note that the number average molecular weight was calculated by standard polystyrene conversion method using GPC.

For example, commercially available products of the ingredient (D) include, but are not limited to, Dynasylan 6490 and Dynasylan 6498 (manufactured by EVONIK) and X-12-1048, X-12-105, KR-513, and X-40-9272B (manufactured by Shin-Etsu Chemical Co., Ltd.).

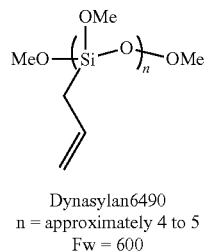

Dynasylan6490
n = approximately 4 to 5
Fw = 600

The amount of the ingredient (D) blended is, though not particularly limited, preferably 0.1 to 30 parts by mass, further preferably 0.3 to 20 parts by mass, and particularly preferably 0.5 to 10 parts by mass relative to 100 parts by mass of the ingredient (A). When the amount is 0.1 parts by mass or more, the curable resin composition has low viscosity and workability is improved. When the amount is 30 parts by mass or less, it is possible to obtain a cured product excellent in hydrogen gas barrier property.

<Ingredient (E)>

Furthermore, the present invention containing the silane compound represented by general formula (1) as the ingredient (E) makes it possible to even more reduce the viscosity and to improve the adhesiveness of the curable resin composition of the present invention.

$$Si(OR)_{4-(m+n)}(X)_m(R)_n \tag{1}$$

where R in the formula represents an alkyl group having 1 to 20 carbon atoms, X is any of a vinyl group, an allyl group, a (meth)acryloyl group, and a styryl group, m and n are each an integer, m is 1 to 3, n is 0 to 2, and m+n≤3.

The ingredient (E) includes vinyl trimethoxysilane, vinyl triethoxysilane, 3-methacryloxypropylmethyldimethoxysilane, 3-methacryloxypropyltrimethoxysilane, 3-acryloxypropyltrimethoxysilane, 3-methacryloxypropylmethyldiethoxysilane, 3-methacryloxypropyltriethoxysilane, p-styryltrimethoxysilane, and allyltrimethoxysilane.

Commercially available products of the ingredient (E) include, but are not particularly limited to, KBM-1003, KBE-1003, KBM-502, KBE-502, KBM-503, KBE-503, KBM-5103, and KBM-1403 (manufactured by Shin-Etsu Chemical Co., Ltd.) and Z-6825 (manufactured by Dow Corning Toray Co., Ltd.).

The amount of the ingredient (E) blended is, though not particularly limited, preferably 0.1 to 50 parts by mass, further preferably 0.3 to 30 parts by mass, and particularly preferably 0.5 to 20 parts by mass relative to 100 parts by mass of the ingredient (A). When the amount is 0.1 parts by mass or more, the adhesiveness and the curable resin composition are lowered in viscosity and workability is improved. When the amount is 50 parts by mass or less, it is possible to obtain a cured product excellent in rubber physical property.

<Optional Ingredients>

To the compositions of the present invention, it is possible to use various types of elastomers such as cross-linking agents, reaction rate regulators, and styrene-based copolymers, plasticizers such as fillers, storage stabilizers, antioxidants, light stabilizers, and polyalphaolefins, and additives such as pigments, flame retardants, and surfactants as long as the purpose of the present invention is not impaired.

Cross-linking agents may be added to the present invention. The cross-linking agents include, for example, 2,4,6-tris(allyloxy)-1,3,5-triazine, 1,2-polybutadiene, 1,2-polybutadiene derivatives, trimethylolpropane diallyl ether, pentaerythritol triallyl ether, pentaerythritol tetra (meth) acrylate, trimethylolpropane tri(meth)acrylate, trimethylolpropane di(meth)acrylate, triallyl phosphate ester, triallyl isocyanurate, diallyl isocyanurate, diallyl monoglycidyl isocyanurate, diallyl monobenzyl isocyanurate, diallyl monopropyl isocyanurate, diallyl phthalate, triallyl trimellitate, diethylene glycol bisallyl carbonate, trimethylolpropane diallyl ether, trimethylolpropane triallyl ether, pentaerythritol triallyl ether, pentaerythritol tetraallyl ether, 1,1,2,2-tetraallyloxyethane, diallylidene pentaerythrit, triallyl cyanurate, 1,2,4-trivinylcyclohexane, 1,4-butanediol diallyl ether, nonanediol diallyl ether, 1,4-cyclohexanedimethanol diallyl ether, triethylene glycol diallyl ether, trimethylolpropane trivinyl ether, pentaerythritol tetravinyl ether, diallyl ether of bisphenol S, divinylbenzene, divinylbiphenyl, 1,3-diisopropenylbenzene, 1,4-diisopropenylbenzene, 1,3-bis(allyloxy) adamantane, 1,3-bis(vinyloxy) adamantane, 1,3,5-tris(allyloxy) adamantane, 1,3,5-tris(vinyloxy) adamantane, dicyclopentadiene, vinylcyclohexene, 1,5-hexadiene, 1,9-decadiene, diallyl ether, bisphenol A diallyl ether, 2,5-diallylphenol allyl ether, oligomers thereof, and allyl ether of novolac phenol. Among them, 1,2,4-trivinylcyclohexane, triallyl isocyanurate, 2,4,6-tris(allyloxy)-1,3,5-triazine, 1,2-polybutadiene, and the like are preferable because of excellent miscibility with the ingredient (A) of the present invention.

Reaction rate regulators may be added to the present invention. The reaction rate regulators include, for example, compounds containing an aliphatic unsaturated bond, organic phosphorus compounds, organic sulfur compounds, and nitrogen-containing compounds. These may be used singly or in combination of two or more kinds.

The compounds containing an aliphatic unsaturated bond include, specifically, 3-hydroxy-3-methyl-1-butyne, 3-hydroxy-3-phenyl-1-butyne, 3,5-dimethyl-1-hexyne-3-ol, propargyl alcohols such as 1-ethynyl-1-cyclohexanol, ene-yne compounds, maleic anhydride, maleic acid esters such as dimethyl maleate, and the like. Here, the organic phosphorus compounds include, specifically, triorganophosphines, diorganophosphines, organophosphones, triorganophosphites, and the like. Here, the organic sulfur compounds include, specifically, organomercaptans, diorganosulf ides, hydrogen sulfide, benzothiazole, thiazole, benzothiazole disulfide, and the like. Here, the nitrogen-containing compounds include, specifically, N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, 2,2'-bipyridine, and the like.

Styrene-based copolymers may be blended in the present invention for the purpose of adjusting the rubber physical property of the cured product. For example, the styrene-based copolymers include, but are not particularly limited to, styrene-butadiene copolymers, styrene-isoprene copolymers (SIP), styrene-butadiene copolymers (SB), styrene-ethylene-butylene-styrene copolymers (SEBS), styrene-isobutylene-styrene copolymers (SIBS), acrylonitrile-styrene copolymers (AS), styrene-butadiene-acrylonitrile copolymers (ABS), and the like.

For the purpose of improving e.g. the elastic modulus and the fluidity of the cured product, fillers may be added to the present invention to an extent that does not impair the storage stability. Specific examples thereof include organic powders, inorganic powders, metallic powders, and the like. Fillers of inorganic powder include glass, fumed silica, alumina, mica, ceramics, silicone rubber powders, calcium carbonate, aluminum nitride, carbon powders, kaolin clay, dried clay minerals, and dried diatomaceous earth, and the like. The amount of inorganic powder blended is preferably about 0.1 to 100 parts by mass relative to 100 parts by mass of the ingredient (A). When the amount is more than 0.1 parts by mass, the effect will not be reduced. When the amount is 100 parts by mass or less, it is possible to obtain sufficient fluidity of the curable resin composition and to obtain good workability.

Fumed silica can be blended for the purpose of adjusting the viscosity of the curable resin composition or improving the mechanical strength of the cured product. Preferably, it is possible to use ones hydrophobically treated with organochlorosilanes, polyorganosiloxane, hexamethyldisilazane, or the like. Specific examples of the fumed silica include, for example, commercially available products manufactured by Nippon Aerosil Co., Ltd., such as trade name Aerosil R 974, R 972, R 972 V, R 972 CF, R 805, R 812, R 812 S, R 816, R 8200, RY 200, RX 200, RY 200 S, and R 202.

Fillers of organic powder include, for example, polyethylene, polypropylene, nylon, cross-linked acrylic, cross-linked polystyrene, polyesters, polyvinyl alcohols, polyvinyl butyral, and polycarbonate. The amount of organic powder blended is preferably about 0.1 to 100 parts by mass relative to 100 parts by mass of the ingredient (A). When the amount is more than 0.1 parts by mass, the effect will not be reduced. When the amount is 100 parts by mass or less, it is possible to obtain sufficient fluidity of the curable resin composition and to obtain good workability.

Fillers of metallic powder include, for example, gold, platinum, silver, copper, indium, palladium, nickel, alumina, tin, iron, aluminum, stainless steel, and the like. The amount of metallic powder blended is preferably about 0.1 to 100 parts by mass and more preferably 1 to 50 parts by mass relative to 100 parts by mass of the ingredient (A).

Antioxidants may be added to the present invention. The antioxidant include, for example, quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-me thylphenyl acrylate, 2-[1-(2-hydroxy-3,5-di-tert-pentylphenyl) ethyl]-4, 6-di-tert-pentylphenyl acrylate, 4,4'-butylidenebis(6-tert-butyl-3-methyl phenol), 4,4'-thiobis(6-tert-butyl-3-methyl phenol), 3,9-bis[2-[3-(3-tert-butyl-4-hydroxy-5-methylphenyl) propionyloxy]-1,1-dimethylethyl]-2,4,8,10-tetraoxaspiro [5,5] undecane, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, N,N'-hexane-1,6-diylbis[3-(3,5-di-tert-butyl-4-hydroxypheny 1) propionamide], benzene propanoic acid, 3,5-bis(1,1-dimethylethyl)-4-hydroxy, $C_7$-$C_9$ side chain alkyl ester, 2,4-dimethyl-6-(1-methylpentadecyl) phenol, diethyl [[3,5-bis(1,1-dimethylethyl)-4-hydroxyphenyl] methyl]phosphonate, 3,3',3",5,5',5"-hexa-tert-butyl-a,a',a"-(mesitylene-2,4,6-tolyl) tri-p-cresol, calcium diethyl bis[[3,5-bis(1,1-dimethylethyl)-4-hydroxyphenyl] methyl]phosphonate, 4,6-bis(octylthiomethyl)-o-cresol, ethylenebis(oxyethylene) bis[3-(5-tert-butyl-4-hydroxy-m-tolyl) propionate], hexamethylenebis[3-(3,5-di-tert-butyl-4-hydroxyphenyl) propionate, 1,3,5-tris(3,5-di-tert-butyl-4-hydroxybenzyl)-1,3,5-triazin e-2,4,6 (1H,3H,5H)-trione, 1,3,5-tris[(4-tert-butyl-3-hydroxy-2,6-xylyl) methyl]-1,3,5-triazine-2,4,6 (1H,3H,5H)-trione, a reaction product of N-phenylbenzenamine and 2,4,6-trimethylpentene, 2,6-di-tert-butyl-4-(4,6-bis(octylthio)-1,3,5-triazine-2-yl amino) phenol, picric acid, and citric acid; phosphorus-based compounds such as tris(2,4-di-tert-butylphenyl)phosphite, tris[2-[[2,4,8,10-tetra-tert-butyldibenzo[d,f] [1,3,2]dioxap hosphefin-6-yl] oxy] ethyl] amine, bis(2,4-di-tert-butylphenyl)pentaerythritol diphosphite, bis[2,4-bis(1,1-dimethylethyl)-6-methylphenyl]ethyl ester phosphorous acid, tetrakis(2,4-di-tert-butylphenyl) [1,1-bisphenyl]-4,4'-diyl bisphosphonite, 6-[3-(3-tert-butyl-4-hydroxy-5-methylphenyl)propoxy]-2,4,8,10-tetra-tert-butyl dibenz[d, f][1,3,2]dioxaphosphefin; amine-based compounds such as phenothiazine; lactone-based compounds; and vitamin E-based compounds. Among these, phenol-based compounds are preferable.

Light stabilizers may be added to the present invention. The light stabilizers include, for example, hindered amine types such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]eth yl]-4-[3-(3,5-di-tert-butyl-4-hydroxyphenyl)propionyloxy]-2,2,6,6-tetramethylpiperidine, 1,2,2,6,6-pentamethyl-4-piperidinyl-methacrylate, bis(1,2,2,6,6-pentamethyl-4-piperidinyl) [[3,5-bis(1,1-dimet hylethyl)-4-hydroxyphenyl]methyl]butyl malonate, decanedioic acid bis(2,2,6,6-tetramethyl-1(octyloxy)-4-piperidinyl)ester, a reaction product of 1,1-dimethylethyl hydroperoxide and octane, N,N',N",N"'-tetrakis-(4,6-bis-(butyl-(N-methyl-2,2,6,6-te tramethylpiperidine-4-yl) amino)-triazine-2-yl)-4,7-diazadec ane-1,10-diamine, a polycondensate of N-(2,2,6,6-tetramethyl-4-piperidyl) butylamine with dibutylaminel-1,3,5-triazine.N,N'-bis(2,2,6,6-tetramethyl-4-p iperidyl-1,6-hexamethylenediamine, poly[[6-(1,1,3,3-tetramethylbutyl)amino-1,3,5-triazine-2,4-diyl] [(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,2 0-diazadispiro [5,1,11,2] heneicosan-21-one, β-alanine, N,-(2,2,6,6-tetramethyl-4-piperidinyl)-dodecyl ester/tetradecyl ester, N-acetyl-3-dodecyl-1-(2,2,6,6-tetramethyl-4-piperidinyl)pyr rolidine-2,5-dione, 2,2,4,4-tetramethyl-7-oxa-3,20-diazadispiro [5,1,11,2] heneicosan-21-one, 2,2,4,4-tetramethyl-21-oxa-3,20-diazacyclo-[5,1,11,2]-henei cosan-20-propanoic acid dodecyl ester/tetradecyl ester, propanedioic acid, [(4-methoxyphenyl)-methylene]-bis(1,2,2,6,6-pentamethyl-4-p iperidinyl)ester, higher fatty acid esters of 2,2,6,6-tetramethyl-4-piperidinol, 1,3-benzenedicarboxamide, N,N'-bis(2,2,6,6-tetramethyl-4-piperidinyl); benzophenone-based compounds such as octabenzone; benzotriazole-based compounds such as 2-(2H-benzotriazole-2-yl)-4-(1,1,3,3-tetramethylbutyl) pheno 1, 2-(2-hydroxy-5-methylphenyl)benzotriazole, 2-[2-hydroxy-3-(3,4,5,6-tetrahydrophthalimide-methyl)-5-met hylphenyl]benzotriazole, 2-(3-tert-butyl-2-hydroxy-5-methylphenyl)-5-chlorobenzotria zole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)p ropionate and polyethylene glycol, 2-(2H-benzotriazole-2-yl)-6-dodecyl-4-methyl phenol; benzoate-based compounds such as 2,4-di-tert-butylphenyl-3,5-di-tert-butyl-4-hydroxybenzoate; and triazine-based compounds such as 2-(4,6-diphenyl-1,3,5-triazine-2-yl)-5-[(hexyl)oxy]phenol. Hindered amine-based compounds are particularly preferable.

The curable resin composition of the present invention can be produced by a conventionally known method. It is possible to produce the curable resin composition by, for example, blending predetermined amounts of the ingredient (A) to the ingredient (D), followed by mixing at a temperature of preferably 10 to 70° C. for preferably 0.1 to 5 hours using a mixing means such as a mixer.

<Application Method>

As a method for applying the curable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating. The curable resin composition of the present invention is preferably liquid at 25° C. from the viewpoint of easiness in application.

<Curing Method>

Although the method for curing the curable resin composition of the present invention is not particularly limited, curing is possible by heating or irradiating the curable resin composition with active energy rays such as ultraviolet rays and visible light.

When heat-curing the curable resin composition of the present invention, the curing temperature is, though not particularly limited, preferably 30 to 300° C., more preferably 50 to 200° C., and further preferably 60 to 150° C. The curing time is, though not particularly limited, preferably 20 minutes or more and less than 5 hours and further preferably 40 minutes or more and 3 hours or less in the case of 60 to 150° C.

Consider the case of curing by irradiating the curable resin composition of present invention with active energy rays. The light source includes, but is not particularly limited to, low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. As for an irradiation dose of light irradiation, a total dose is preferably 10 kJ/$m^2$ or more and more preferably 15 kJ/$m^2$ or more from the viewpoint of the properties of a cured product.

<Cured Product>

A cured product of the present invention can be obtained by curing or preferably photocuring the curable resin composition of the present invention in the foregoing curing method by irradiation with active energy rays such as ultraviolet rays. A cured product of the present invention may be any product obtained by curing the curable resin composition of the present invention regardless of a curing method employed.

For example, when the curable resin composition of the present invention is a two-liquid type composition, it is possible to cure at room temperature after mixing. In the case of use as a two-liquid type composition, it is preferable that one liquid contain the ingredient (A) and the other liquid contain the ingredient (B). By separating the ingredient (A) and the ingredient (B) into separate liquids in this way, it is possible to suppress unnecessary reactions during storage and to enhance the storage stability. In use, curing is possible by mixing the two liquids or by bringing them into contact with each other after separate application.

<Usage>

Preferable use of the curable resin composition of the present invention or a cured product thereof is a sealing agent. In the present invention, the sealing agent includes usages such as an adhesive, a coating agent, an injecting agent, a potting agent, and the like. Note that for use in such usages, the curable resin composition of the present invention is preferably liquid at 25° C.

Since the curable resin composition of the present invention is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the curable resin composition of the present invention has low viscosity as well as properties such as high elongation property, hydrogen gas barrier property, adhesiveness.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as power sources for automobiles, power generators for households, small power source for electronic equipment such as a mobile phone, and power sources for emergency.

Figure 2:
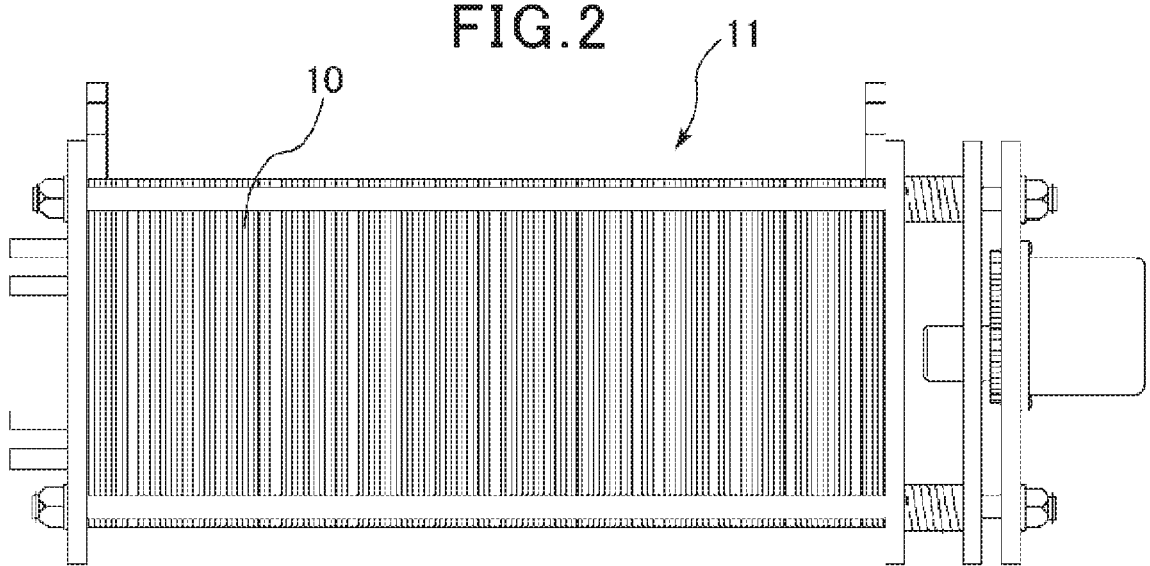
FIG. 2 is a schematic diagram illustrating the entire fuel cell.

As illustrated in FIG. 1, the cell 1 of the typical solid polymer fuel cell has the structure including: the electrolyte membrane electrode assembly 5 (MEA) structured such that the polymer electrolyte membrane 4 is nipped between the air electrode 3a and the fuel electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a cooling water flow path 9. Note that a package including several hundreds of such cells stacked on one another is referred to as a cell stack 10 as illustrated in FIG. 2.

When the fuel gas (hydrogen gas) is supplied to the fuel electrode and the oxidation gas (oxygen gas) is supplied to the oxygen electrode (air electrode), the following reactions occur at the respective electrodes, and a reaction to generate water ($H_2+1/2O_2 \rightarrow H_2O$) occurs as a whole. To be more specific, protons (H+) generated at the fuel electrode as described below are diffused inside the solid polymer membrane to move to the oxygen electrode side, and water ($H_2O$) generated by reaction with the oxygen is discharged from the oxygen electrode side.

Fuel electrode (anode electrode): $H_2 \rightarrow 2H^+ + 2e^-$
Oxygen electrode (cathode electrode): $1/2O_2 + 2H^+ + 2e^- \rightarrow H_2O$ In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas, and the like. Specifically, the sealing agent is used between adjacent separators, between a separator and a frame, between a frame and an electrolyte membrane or MEA, and so on.

As the polymer electrolyte membrane, there is a cation exchange membrane having ion conductivity, and a preferable one is made of a fluorine-based polymer having a sulfonic acid group or the like, because it is chemically stable and has high resistance under high-temperature operation. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the curable resin composition of the present invention makes it possible to bond the polymer electrolyte membrane.

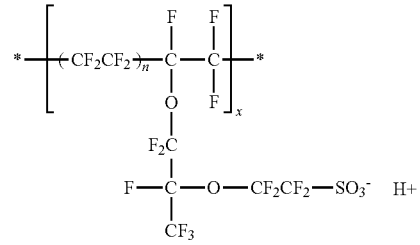

Nafion (Registered Trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte membrane. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidizing gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. As a material for the frame, there are thermoplastic resins such as polyvinyl chloride, polyethylene naphthalate (PEN), polyethylene terephthalate (PET), polypropylene (PP), and polycarbonate. In addition, in order to bond members using the curable resin composition of the present invention or a cured product thereof, it is preferable that the members be light-transmissive.

The fuel cell of the present invention is characterized in that sealing is provided by the curable resin composition of the present invention or a cured product thereof. The members needed to be sealed in the fuel cell are the separators, the frame, the electrolyte membrane, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path.

<Sealing Method>

A sealing method using the curable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is an adhesive sealing method involving: applying the curable resin composition of the present invention to a flange of a seal target component by an automatic coater or the like; and curing the curable resin composition, with the flange stuck on another flange, by heating or irradiation with active energy rays such as ultraviolet rays from the light-transmissive flange side. More specifically, this is a method for sealing at least part of at least two flanges of seal target components including the at least two flanges, at least one of which is light-transmissive, allowing active energy rays to pass therethrough, the method characterized by including the steps of: applying the foregoing curable resin composition to a surface of at least one of the flanges; sticking the one flange with the curable resin composition applied thereto onto the other flange with the curable resin composition interposed in between; and sealing the at least part of between the at least two flanges by curing the curable resin composition by irradiation with active energy rays through the light-transmissive flange.

CIPG is a method involving: applying the curable resin composition of the present invention in the form of a bead to a flange of a seal target component by an automatic coater or the like; forming a gasket by curing the curable resin composition by heating or irradiation with active energy rays such as ultraviolet rays; and performing compression sealing with the flange stuck on another flange. More specifically, this is a method for sealing at least part of at least two flanges of seal target components including the at least two flanges, the method characterized by including the steps of: applying the foregoing curable resin composition to a surface of at least one of the flanges; irradiating the applied curable resin composition with active energy rays to cure the curable resin composition, thereby forming a gasket composed of a cured product of the curable resin composition; placing the other flange on the gasket, and sealing the at least part of between the at least two flanges in such a way that the other flange and the one flange with the curable resin composition applied thereto are pressure bonded together with the gasket interposed in between.

MIPG is a method involving: placing a mold in pressure contact with a flange of a seal target component in advance; forming a gasket by injecting the curable resin composition into a cavity formed between the mold made of a light-transmissive material and the flange, and by heating or irradiation with the active energy rays such as ultraviolet rays; and performing compression sealing with the flange stuck on the other flange. Here, the mold is preferably made of a light-transmissive material, which is specifically glass, polymethylmethacrylate (PMMA), polycarbonate, cycloolefin polymer, olef in, or the like. In addition, for easy demolding of the gasket from the mold after the formation of the gasket, it is preferable to apply a release agent such as a fluorine-based agent or a silicone-based agent. More specifically, this is a method for sealing at least part of at least two flanges of seal target components including the at least two flanges, the method characterized by including the steps of: placing a gasket formation mold on at least one of the flanges; injecting the foregoing curable resin composition into at least part of a cavity formed between the gasket formation mold and the flange on which the mold is placed; irradiating the curable resin composition with the active energy rays to cure the curable resin composition, thereby forming a gasket composed of a cured product of the curable resin composition; detaching the mold from the one flange; and placing the other flange on the gasket and sealing the at least part of between the at least two flanges by pressure bonding the one flange and the other flange together with the gasket interposed in between.

The liquid injection molding is a method involving: forming a gasket by injecting the curable resin composition of the present invention with a predetermined pressure into a mold made of a light-transmissive material, and (photo) curing the curable resin composition by irradiation with active energy rays such as ultraviolet rays; and performing compression sealing with the flange stuck on the other flange. Here, the mold is preferably made of a light-transmissive material, which is specifically glass, PMMA, polycarbonate, cycloolefin polymer, olef in, or the like. In addition, for easy demolding of the gasket from the mold after the formation of the gasket, it is preferable to apply a release agent such as a fluorine-based agent, a silicone-based agent, or the like.

EXAMPLES

Hereinafter, the present invention will be described in further details by taking Examples, but the present invention should not be limited to these Examples.

<Preparation of Curable Resin Composition>

Each of the ingredients was sampled in an amount in parts by mass shown in Table 1, mixed for 60 minutes with a planetary mixer at room temperature (25° C.) to prepare a curable resin composition, and the various physical properties were measured as follows. Note that the detailed preparation amounts are indicated in Table 1, and the numerical values are expressed in parts by mass. However, only the ingredient (C) is expressed in μl.

The amount of the ingredient (B) added in each of Examples and comparative Examples in Table 1 amounts to a 1.2 equivalent ratio (hydrosilyl group/carbon-carbon double bonds). The hydrosilyl group means a hydrosilyl group contained in the ingredient (B). In addition, the carbon-carbon double bond means the total number of carbon-carbon double bonds in the alkenyl groups contained in the ingredient (A), the ethylenically unsaturated groups contained in the ingredient (D), and the vinyl groups, the allyl groups, the (meth)acryloyl groups, and the styryl groups contained in the ingredient (E).

Moreover, the amount of the ingredient (C) added in each of Examples and Comparative Example (except Comparative Example 2) in Table 1 is such an amount that the amount of the ingredient (C) added is $1\times10^{-3}$ mol when 1 mol equals the total of the number of carbon-carbon double bonds in the alkenyl groups contained in the ingredient (A), the number of carbon-carbon double bonds in the ethylenically unsaturated groups contained in the ingredient (D), and the number of carbon-carbon double bonds in the vinyl groups, the allyl groups, the (meth)acryloyl groups, and the styryl groups contained in the ingredient (E). The amount of the ingredient (C) added in Comparative Example 2 is in an amount of $1\times10^{-3}$ mol.

<Ingredient (A)>
a1: polyisobutylene having an alkenyl group (allyl group) at both ends, 1700 Pa·s at 25° C. (EPION 400A, manufactured by Kaneka Corporation).

<Ingredient (B)>
b1: hydrosilyl group-containing compound (CR-300, manufactured by Kaneka Corporation)

<Ingredient (C)>
c1: isopropyl alcohol solution of platinum divinyltetramethyldisiloxane complex (Pt-VTS-3.0 IPA, manufactured by Umicore Precious Metals Japan)

<Ingredient (D)>
d1: polydimethylsiloxane oligomer having one or more vinyl groups and one or more methoxysilyl groups in one molecule having a number average molecular weight of 466 (Dynasylan 6490, manufactured by EVONIK)
d2: polydimethylsiloxane oligomer having one or more acryloyl groups and one or more methoxysilyl groups in one molecule having a number average molecular weight of 378 (X-12-1048, manufactured by Shin-Etsu Chemical Co., Ltd.)
d3: polydimethylsiloxane oligomer having one or more acryloyl groups and one or more methoxysilyl groups in one molecule having a number average molecular weight of 1044 (X-12-1050, manufactured by Shin-Etsu Chemical Co., Ltd.)
d4: polydimethylsiloxane oligomer having one or more acryloyl groups and one or more methoxysilyl groups in one molecule having a number average molecular weight of 901 (KR-513, manufactured by Shin-Etsu Chemical Co., Ltd.)
d5: polydimethylsiloxane oligomer having one or more methacryloyl groups and one or more methoxysilyl groups in one molecule having a number average molecular weight of 616 (X-40-9272B, manufactured by Shin-Etsu Chemical Co., Ltd.)

<Comparative Ingredient for Ingredient (D)>
d'1: polydimethylsiloxane oligomer having one or more glycidyl groups and one or more methoxysilyl groups in one molecule (X-41-1056, manufactured by Shin-Etsu Chemical Co., Ltd.)

<Ingredient (E)>
e1: 3-methacryloxypropyltrimethoxysilane (KBM-503, manufactured by Shin-Etsu Chemical Co., Ltd.)
e2: 3-acryloxypropyltrimethoxysilane (KBM-5103, manufactured by Shin-Etsu Chemical Co., Ltd.)
e3: p-styryltrimethoxysilane (KBM-1403, manufactured by Shin-Etsu Chemical Co., Ltd.)
e4: allyltrimethoxysilane (Z-6825, manufactured by Dow Corning Toray Co., Ltd.)

<Other>
plasticizer: polyalphaolefin-based plasticizer (SpectraSyn 10, manufactured by ExxonMobil)

The test methods carried out in Examples and Comparative Examples of Table 1 are as follows.

<Viscosity Measurement Method>
The viscosity (Pa·s) of the curable resin composition was measured with a cone plate type viscometer (manufactured by Brookfield) under the following measurement conditions. Evaluation was carried out based on the following criteria, and the results are shown in Table 1.
Measurement conditions:

| Cone type | CPE-52 |
| Rotational speed | 0.5 rpm |
| Shear rate | 1.0 l/s |
| Temperature | 25° C. |

[Evaluation Criteria]
very good: 300 Pa·s or less
good: over 300 Pa·s and 600 Pa·s or less
bad: over 600 Pa·s <Method for Testing Shear Bond Strength for PEN>
A curable resin composition was applied to a test piece made of PEN (polyethylene naphthalate resin) having a width of 25 mm, a length of 100 mm, and a thickness of 1.6 mm. Thereafter, a test piece made of PEN similar to the above was bonded and fixed so as to have a width of 25 mm and a length of 10 mm, followed by heat-curing by heating at 130° C. for 1 hour to prepare a test piece. Both ends of the test piece were fixed and tensile measurement was carried out in accordance with JIS K-6850 at a pulling rate of 10 mm/min. Evaluation was carried out based on the following criteria, and the results are shown in Table 1. In the present invention, 0.5 MPa or more is preferable because of excellent adhesiveness to PEN used in the frame members of a fuel cell.

[Evaluation Criteria]
very good: 1.8 MPa or more
good: 0.5 MPa or more and less than 1.8 MPa
bad: less than 0.5 MPa <Method for Measuring Elongation Rate of Cured Product>
The thickness of the curable resin composition was set to 2 mm, followed by heating at 130° C. for 1 hour for heat-curing to prepare a sheet-shaped cured product. Punchout was done with a No. 3 dumbbell to prepare a test piece, followed by drawing of mark lines in the test piece with a spacing of 20 mm.

The test piece was fixed to the chuck in the same manner as the measurement of the tensile strength and was pulled at a pulling rate of 500 mm/min until the test piece was cut. Since the test piece extended while being measured and the distance between the mark lines was widened, measurement was carried out on the interval between the marks with a caliper until the test piece was cut. Based on the initial mark line interval, the rate of elongation was defined as "elongation rate (%)." Evaluation was carried out based on the following criteria, and the results are shown in Table 1.

[Evaluation Criteria]
very good: 350% or more
good: 100% or more and less than 350%
bad: less than 100%

<Test for Hydrogen Gas Barrier Property>
The thickness of the curable resin composition was set to 2 mm, followed by heating at 130° C. for 1 hour for heat-curing to prepare a sheet-shaped cured product. The cured product was used for measurement in accordance with JIS K 7126-1: 2006 (plastic-film and sheet-gas permeability test method—Part 1: differential pressure method). Note that the type of the test was a pressure sensor method under the condition of 23° C. Measurement was performed using a sheet of 1 mm thick with the test gas (hydrogen gas) on the high pressure side under 100 kPa. Evaluation was carried out based on the following evaluation criteria. Table 1 shows the results. In the case of use as a sealing agent for a fuel cell, the hydrogen gas barrier property is preferably less than $1 \times 10^{-14}$ mol·m/m²·s·Pa.

[Evaluation Criteria]
good: less than $1 \times 10^{-14}$ mol·m/m²·s·Pa
bad: $1 \times 10^{-14}$ mol·m/m²·s·Pa or more a sealing agent, an adhesive, a coating agent, an injecting agent, a potting agent, and the like. Therefore, the curable resin composition of the present invention is industrially useful.

REFERENCE SIGNS LIST

1 cell of solid polymer fuel cells
2 separator
3a air electrode (cathode)
3b fuel electrode (anode)
4 polymer electrolyte membrane
5 electrolyte membrane electrode assembly (MEA)
6 frame
7 adhesive or sealing agent
8a fuel gas flow path
8b oxidation gas flow path
9 cooling water flow path
10 cell stack
11 solid polymer fuel cell

TABLE 1

| Ingredient | | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| (A) | a1 | 100 | 100 | 100 | 100 | 100 | 100 | 100 | 100 | 100 | 100 | 100 | 100 |
| (B) | b1 | 13 | 13 | 10 | 13 | 12 | 15 | 16 | 13 | 13 | 13 | 4.5 | 11 |
| (C) | c1 | 249 μl | 124 μl | 91 μl | 132 μl | 118 μl | 142 μl | 146 μl | 125 μl | 130 μl | 249 μl | 83 μl | 286 μl |
| (D) | d1 | 3 | | | | | | | | | 1 | | |
| | d2 | | 3 | | | | 3 | | | | | | |
| | d3 | | | 3 | | | | 3 | | | | | |
| | d4 | | | | 3 | | | | 3 | | | | |
| | d5 | | | | | 3 | | | | 3 | | | |
| | d'1 | | | | | | | | | | | | 3 |
| (E) | e1 | | | | | | 3 | 3 | 3 | 3 | | | |
| | e2 | | | | | | 3 | 3 | 3 | 3 | | | |
| | e3 | | | | | | | | | | 3 | | |
| | e4 | | | | | | | | | | | | 3 |
| Plasticizer | | 30 | 30 | 30 | 30 | 30 | 30 | 30 | 30 | 30 | 30 | 30 | 30 |
| Viscosity | | good | good | good | good | good | very good | very good | very good | very good | good | bad | good |
| Shear Bond Strength for PEN | | good | good | good | good | good | good | good | very good | very good | very good | bad | good |
| Elongation Rate | | good | good | good | good | good | good | good | good | good | very good | good | good |
| Hydrogen Gas Barrier Property | | good | good | good | good | good | good | good | good | good | good | good | bad |

Examples 1 to 5 of Table 1 showed that the present invention had low viscosity as well as properties such as high elongation property, hydrogen gas barrier property, and adhesiveness. Note that Examples 6 to 9, added with the ingredient (E) of the present invention, have lower viscosity and thus have better workability than that of Examples 1 to 5. Also, according to Example 10, it can be seen that it is possible to improve adhesiveness and high elongation property by using p-styryltrimethoxysilane among the ingredients (E).

On the other hand, Comparative Example 1, not containing the ingredient (D) of the present invention, had high viscosity and poor adhesiveness. In addition, Comparative Example 2 used a polydimethylsiloxane oligomer having one or more glycidyl groups and one or more methoxysilyl groups in one molecule which is not the ingredient (D) of the present invention. Comparative Example 2 showed a poor hydrogen gas barrier property of the cured product and was incapable of being applied to a sealing agent.

INDUSTRIAL APPLICABILITY

The curable resin composition of the present invention has low viscosity as well as properties such as high elongation property, hydrogen gas barrier property, and adhesiveness, and thus can be applied to various usages such as

What is claimed is:

1. A curable resin composition comprising ingredients (A) to (D):
ingredient (A): a vinyl polymer having one or more alkenyl groups in one molecule
ingredient (B): a compound having one or more hydrosilyl groups in one molecule
ingredient (C): a hydrosilylation catalyst
ingredient (D): a polydiorganosiloxane oligomer having one or more ethylenically unsaturated groups and one or more hydrolyzable silyl groups in one molecule,
   wherein the amount of the ingredient (D) is 0.1 to 30 parts by mass relative to 100 parts by mass of the ingredient (A), and wherein the number average molecular weight of the ingredient (D) is 250 to 10000.

2. The curable resin composition according to claim 1, further comprising a silane compound represented by general formula (1) as ingredient (E)

$$Si(OR)_{4-(m+n)}(X)_m(R)_n \quad (1),$$

where R represents an alkyl group having 1 to 20 carbon atoms, X is any of a vinyl group, an allyl group, a (meth) acryloyl group, and a styryl group, m is 1 to 3, n is 0 to 2, and m+n≤3.

3. The curable resin composition according to claim 2, wherein the ingredient (E) is selected from 3-methacryloxypropyltrimethoxysilane, 3-acryloxypropyltrimethoxysilane, p-styryltrimethoxysilane, and allyltrimethoxysilane.

4. The curable resin composition according to claim 2, wherein the ingredient (A) is a polyisobutylene having one or more alkenyl groups, wherein the ethylenically unsaturated group of the ingredient (D) is selected from vinyl group, acryloyl group, and methacryloyl group, and wherein the hydrolyzable silyl group of the ingredient (D) is methoxysilyl group.

5. The curable resin composition according to claim 1, wherein the ingredient (A) is a polyisobutylene having one or more alkenyl groups.

6. The curable resin composition according to claim 1, wherein the ethylenically unsaturated group of the ingredient (D) is selected from vinyl group, acryloyl group, and methacryloyl group, and wherein the hydrolyzable silyl group of the ingredient (D) is methoxysilyl group.

7. A curable sealing agent for a fuel cell comprising the curable resin composition according to claim 1.

8. A cured product obtained by curing the curable resin composition according to claim 1.

9. A fuel cell comprising any seal selected from the group consisting of seals between adjacent separators in the fuel cell and seals between a frame and an electrolyte membrane or an electrolyte membrane electrode assembly in the fuel cell, wherein
the any seal contains the cured product according to claim 8.

10. The fuel cell according to claim 9, wherein the fuel cell is a solid polymer fuel cell.

11. A method for sealing at least part of at least two flanges of seal target components including the at least two flanges, at least one of which is a light-transmissive flange allowing active energy rays to pass therethrough, the method comprising the steps of:

applying the curable resin composition according to claim 1 to a surface of at least one of the flanges;
sticking the one flange with the curable resin composition applied thereto onto the other flange with the curable resin composition interposed in between; and
sealing the at least part of the at least two flanges by curing the curable resin composition by irradiation with active energy rays through the light-transmissive flange.

12. A method for sealing at least part of at least two flanges of seal target components including the at least two flanges, comprising the steps of:

applying the curable resin composition according to claim 1 to at least one of the flanges;
irradiating the applied curable resin composition with active energy rays to cure the curable resin composition, thereby forming a gasket composed of a cured product of the curable resin composition;
placing the other flange on the gasket, and sealing the at least part of the at least two flanges in such a way that the other flange and the one flange with the curable resin composition applied thereto are pressure bonded together with the gasket interposed in between.

13. A method for sealing at least part of at least two flanges of seal target components including the at least two flanges, comprising the steps of:

placing a gasket formation mold on at least one of the flanges;
injecting the curable resin composition according to claim 1 into at least part of a cavity formed between the gasket formation mold and the flange on which the mold is placed;
irradiating the curable resin composition with the active energy rays to cure the curable resin composition, thereby forming a gasket composed of a cured product of the curable resin composition;
detaching the mold from the one flange; and
sealing the at least part of the at least two flanges by placing the other flange on the gasket and then pressure bonding the one and the other flanges together with the gasket interposed in between.

* * * * *